United States Patent [19]

Sharp et al.

[11] 4,140,207

[45] Feb. 20, 1979

[54] REVERSIBLE CABLE CONNECTOR

[76] Inventors: Jonathan E. Sharp, 3999 Hillside Dr., Littleton, Colo. 80123; Frank R. Ross, 3640 S. Irving, Englewood, Colo. 80110

[21] Appl. No.: 828,530

[22] Filed: Aug. 29, 1977

[51] Int. Cl.[2] ..................... B65H 59/16; F16G 11/00

[52] U.S. Cl. ................................ 188/65.1; 24/134 P; 24/212; 182/5

[58] Field of Search .................. 24/134 P, 212; 182/5; 188/65.1, 65.2

[56] References Cited

U.S. PATENT DOCUMENTS

| | | | |
|---|---|---|---|
| 1,194,902 | 8/1916 | Urban | 24/212 |
| 1,362,905 | 12/1920 | Vanderdonck | 24/134 P |
| 1,388,455 | 8/1921 | Fleming | 24/134 P |
| 1,434,802 | 11/1922 | Bear | 24/134 R |
| 1,926,975 | 9/1933 | Endsor | 24/134 L |
| 1,959,722 | 5/1934 | Lackner | 24/134 P |
| 3,108,345 | 10/1963 | Kito | 24/134 R |
| 3,179,994 | 4/1965 | Meyer | 24/134 R |
| 3,793,682 | 2/1974 | Nelson | 24/134 P |
| 3,852,943 | 12/1974 | Healy | 182/5 |

*Primary Examiner*—Bernard A. Gelak
*Attorney, Agent, or Firm*—Frank C. Lowe

[57] ABSTRACT

A reversible cable connector to connect a lanyard to a vertically suspended cable of the type which combines a U-shaped shoe to hold the cable in the crotch of the shoe with a lever arm pivotally mounted upon a pivot pin between the side plates of the shoe, the lever having a cam surface at the inner end of the lever arm engaging the cable when the lever is pulled downwardly and a connecting means at the outer end of the lever arm connecting with the lanyard.

6 Claims, 6 Drawing Figures

REVERSIBLE CABLE CONNECTOR

This invention relates to connectors for attaching a lanyard to a vertically suspended cable, and more particularly to an improved cable connector for safety equipment. A desirable property of the present invention resides in the fact that the components of the improved cable connector are reversible and hence, the invention will be called a "reversible cable connector".

The patent to Meyer U.S. Pat. No. 3,179,994, issued Apr. 27, 1965, exemplifies the general type of a cable connector which includes the present invention. The basic structure of such a connector consists of a U-shaped shoe to embrace a vertically suspended cable, and a lever arm pivoted between the sides of the shoe with a cam face adjacent to the pivot to engage the cable within the embrace of the shoe as the lever arm is rotated from an outstanding position, with respect to the cable, to an inclined position. A spring urges the lever arm to such an inclined position to secure the connector onto the cable. This extended end of the lever arm is connected to a lanyard or a lifeline for attachment to a safety belt worn by a workman. Should the workman fall, as from a scaffold, his fall will be checked by pulling the lanyard which pulls the lever downwardly beyond its normally secured position to tightly lock onto the cable. Other features of this basic organization reside in an arrangement where a pivot pin holding the lever arm onto the shoe may be removed to separate the components and to permit the connector to be attached to or removed from a vertically suspended cable.

One disadvantage of the Meyer structure resides in the fact that a fall of a workman is checked very suddenly and the deceleration forces to do this will injure a workman. Thus, other cable connectors have been developed which also check the fall of a workman but in doing so, slide along the rope to reduce the decelerating forces and minimize the chance of a workman being injured. An example of such a cable connector is Rose, et al., U.S. Pat. No. 4,034,828, issued July 12, 1977.

Also, the Meyer connector is difficult to connect and disconnect from the vertically suspended cable and it locks onto the cable and cannot be easily shifted along the cable. The Rose cable connector has advantages over Meyer in that it is easily shifted along the cable and is quickly and easily attached to or disconnected from the vertical cable. It has the disadvantage of being complicated in its structural arrangements. There is clearly a need for an improved and simplified cable connector.

The present invention was conceived and developed with the foregoing and other considerations in view. The present invention comprises, in essence, a cable connector which includes the desirable features of both Meyer and Rose, and is made in an exceedingly simple manner with all components being symmetrical above and below a central transverse horizontal axis, when attached to a vertically suspended cable. The cam is shaped in an exceedingly simple manner to provide a neutral sliding surface to permit it to be shifted up and down the vertical cable whenever the lever arm outstands from the connector shoe at a neutral position. An operator simply grips the lever arm in one hand, holds it at the neutral position and moves the connector to a desired position along the cable with a minimum of effort. The cam lightly contacts the cable at this neutral position and the weight of the lever arm is sufficient to lock the connector onto the cable whenever the lever arm is released. The reversible, symmetrical construction does not permit a user of the cable to assemble the connector in an improper manner. Finally, whenever a lanyard or lifeline is attached to the end of the arm, any pull of this lifeline as by a fall of the wearer attached thereto will pull the arm downwardly to lock the connector onto the cable but it may slide on the cable with a selected limiting force to ease the shock of checking the fall.

It follows that an object of the invention is to provide a novel and improved reversible cable connector which is of utmost simplicity requiring a minimum of parts and which can be manufactured at an absolute minimum of cost.

Another object of the invention is to provide a novel and improved reversible cable connector having a novel and improved connector pin and which can be quickly and easily attached to or disconnected from a vertically suspended cable and which, once attached, can be easily shifted along the reach of the cable to any desired position.

Another object of the invention is to provide a novel and improved reversible cable connector which does not require any orientation of its components in order to be properly attached to a cable since all components are reversible.

Another object of the invention is to provide a novel and improved reversible cable connector which permits the cam surface to engage the cable at the neutral position of the lever arm with a small force such that the connector may be easily shifted on the cable but does not require springs to hold the lever arm and its cam surface against the cable.

Another object of the invention is to provide a novel and improved reversible cable connector which grips a vertical cable with a selected force and then slips down the cable to check a fall to permit the falling workman to decelerate to a stop without being injured by the shock of a sudden stopping.

With the foregoing and other objects in view, our invention comprises certain constructions, combinations and arrangements of parts and elements as hereinafter described, defined in the appended claims, and illustrated in preferred embodiment by the accompanying drawing in which:

Figure 1:
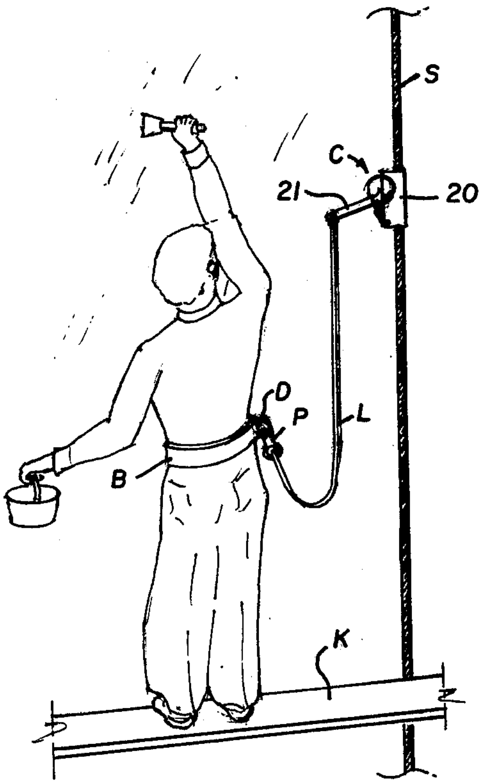
FIG. 1 is a small scale view of a workman on a scaffold wearing a safety belt with a lanyard extending from the safety belt to connect to the improved reversible cable connector which, in turn, is attached to a suspended cable.

Referring more particularly to the drawing, FIG. 1 illustrates an exemplary arrangement wherein the improved cable connector may be used. A vertically suspended safety cable S hangs alongside a scaffold K whereon a workman is located. The workman wears a safety belt B which includes a D-ring D to which a lanyard L is connected as by a suitable snap P. The lanyard extends to the lever arm of the improved connector C which, in turn, is attached to the safety cable S. It is to be noted that should the workman fall from the scaffold, the lanyard will check his fall by pulling the arm of the connector C to first decelerate the fall by sliding the connector down the cable a short distance and then to stop the fall by locking the connector upon the safety cable S. It is to be recognized that other uses of the cable connector are possible which are similar to this exemplary use and the invention is not to be restricted to the manner in which it is used.

Figure 2:
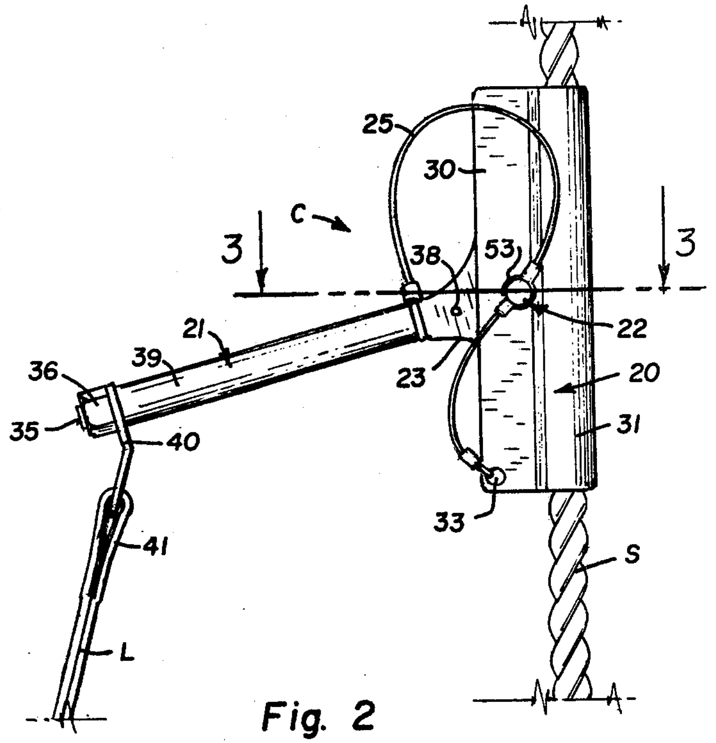
FIG. 2 is an enlarged fragmentary view of the showing at FIG. 1 illustrating the reversible cable connector, a portion of the suspended cable to which it is attached and a portion of the lanyard extending from the lever arm of the connector.

FIG. 2 shows the connector C in further detail and the basic components of this connector are simple and few. An elongated shoe 20, U-shaped in section, embraces the safety cable S. The lever arm 21 extends outwardly from the shoe with the inner end lying between the sides of the U-shaped shoe and this lever arm is connected to the shoe by a pivot pin 22. This inner end of the lever arm, between the sides of the shoe, is a cam 23 which engages the safety cable to press the cable against the crotch of the shoe as will be hereinafter described. The other outward end of the lever arm is connected to the lanyard L as hereinafter described. To complete this basic organization, a lightweight cord 25 connects with the lever arm, the pivot pin and the shoe to prevent separation and possible loss of any one of these components when they are disconnected.

Figure 3:
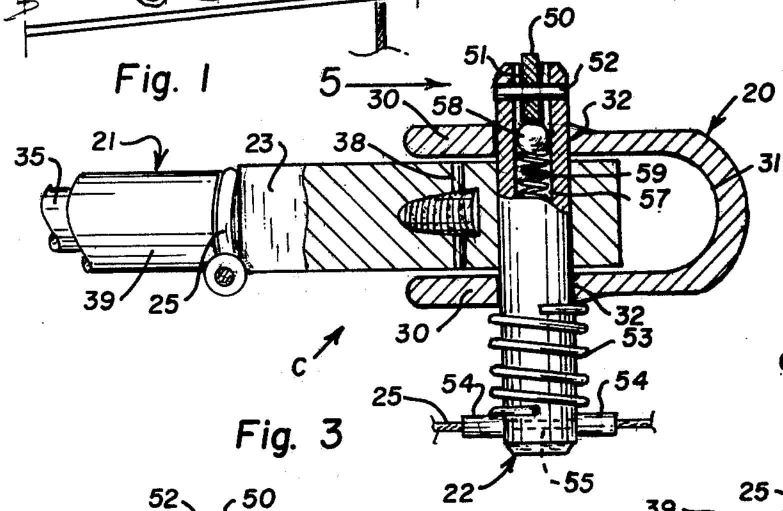
FIG. 3 is a sectional view as taken from the indicated line 3—3 at FIG. 2, but on an enlarged scale.

The shoe 20 is an elongated member, U-shaped in section. It includes opposing side plates 30 in spaced parallelism which are interconnected by the crotch 31 of the U-shaped member. The space between the plates and the inside diameter of the crotch are proportioned to receive a suspended safety cable S having a selected diameter. For example, for a ¾-inch diameter cable, the plate space and the crotch diameter are slightly greater than ¾ inches. The shoe is preferably of aluminum metal and is economically formed by an extrusion process such that the unit is uniform in transverse cross section. Aligned pivot holes 32 are drilled through the side plates 30 at the center of the shoe, at a selected distance from the crotch 31, as best illustrated at FIG. 3, to receive the pivot pin 22 for connection of the lever arm 21 thereto. The shoe is completed by drilling a small hole 33 in one corner of a side plate 30 to provide a connection point for the cord 25.

Figure 4:
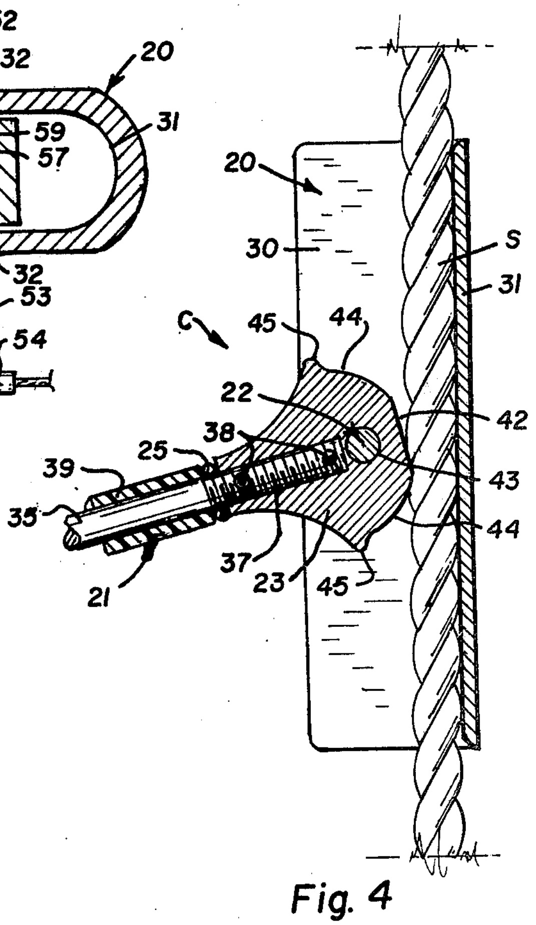
FIG. 4 is a longitudinal sectional view as taken from the indicated line 4—4 at FIG. 3, but on a reduced scale.

The lever arm 21 is formed by a comparatively heavy metal rod 35 with the outer end being threaded to receive a nut 36. The inner end of this rod is threaded to be turned into a mating threaded socket 37 in the cam 23 and roll pins 38 lock this end tightly within the socket as best shown at FIG. 4 The rod 35 is covered by a plastic sleeve 39 which facilitates gripping the assembly. The cord 25 is looped about the rod 35 in a space between the plastic sleeve 39 and the cam 23. To complete the unit, an angle clip 40 is located on the rod 35 between the nut 36 and the outer end of the plastic sleeve 39, and this angle clip has an extension which connects with a loop 41 of the lanyard L.

The cam 23, best shown at FIG. 4, is suggestively formed as an isosceles triangle and has a thickness approaching the space between the opposing side plates 30. It connects to the rod at its apex and is symmetrical from each side of the axis of the rod 35. The cam surface at the base includes a short flat slide face 42 at the center portion which is spaced from the pivot hole 43, through which the pivot pin 22 extends, a distance such as to bear against the cable S with light pressure such that the connector may be slid on the cable with a light hand force. Opposing, curved cam faces 44 extend from each end of the slide face 42 with the distance from the axis of the pivot hole 43 increasing in a regular pattern. These faces may be arcs of circles. The cam surfaces terminate as nubs 45. Accordingly, the rotation of the cam from the transverse neutral position, where the slide face 42 is touching the suspended cable C, to an inclined position such as illustrated, or beyond that position, causes the cam face 44 to bear against the suspended safety cable with increasing pressure. By proper selection of the cam shape, the pressure against the suspended safety cable can be controlled so that whenever the arm is pulled to a limiting position, where the nubs 45 engage the cable, the cam will slide on the safety cable with a specified maximum force or drag, say, for example, 750 pounds. The nub 45 provides a stop to assist in preventing the cam from overriding in case of a worn cam or an undersize cable. The connector thus acts as an effective shock absorber to prevent an excessive force against the body of a workman wearing a safety belt whenever his fall is checked by the connector.

Figure 5:
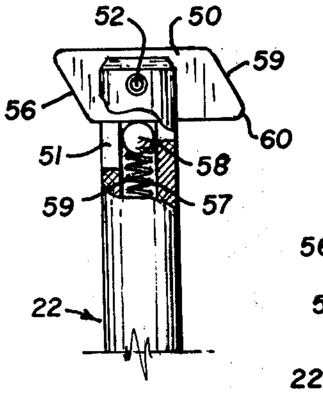
FIG. 5 is a fragmentary view showing an improved lock bar at the end of an improved pivot pin which is used to hold the components of the connector together, the pivot pin being viewed as from the indicated arrow 5 at FIG. 3.

The pivot pin 22 must be inserted into and removed from the pivot holes 32 and 43 of the sleeve and arm of the connector. It is necessary to attach the connector to a suspended safety cable by first placing the shoe over the cable, placing the lever arm in position and then affixing the pivot pin by threading it through the holes 32 in the side plates 30 and through the cam hole 43. The opposite operation is necessary to remove the connector from the cable. To provide for an easily connectible unit, the basic structure of the pivot pin 22 includes a lock bar 50 at its extended end which is mounted in a slot 51 and upon a transverse pivot shaft 52 at the end of the pin 22. This permits the lock bar 50 to rotate from an insert position aligned with the pin, FIG. 6, to a locking position transverse thereto, FIG. 5. A pressure spring 53 at the opposite side of the pin 22 holds the pin in place against the lock bar 50 once the pin is inserted and the lock bar rotated to the locking position. The spring is held in place by lock clips 54 which, in turn, hold the cord 25 in place, the cord passing through a hole 55 at the end of the pin as illustrated in broken lines at FIG. 3.

Ordinarily, the mode of connecting the lever arm 21 onto the shoe 20 is to insert the pivot pin 22 through the pivot holes 32 and 43 in the shoe and cam, as best illustrated at FIG. 3. The pin is pushed beyond the normal locking position by compressing the spring 53 to the point where the lock bar 50 may be rotated from an insert position to the locking position. Ordinarily, this is done by finger manipulation of the lock bar 50. However, in the improved lock bar construction herein disclosed, the user can insert and secure the pin without the need of manipulating the lock bar 50 after the pin is inserted.

Figure 6:
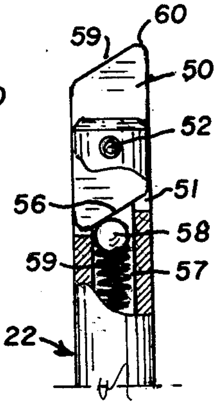
FIG. 6 is a fragmentary view similar to FIG. 5, but with the lock bar of the pivot pin being positioned in alignment as for insertion of the pin into the proper holes in the components of the connector.

To accomplish this, one end of this lock bar 50 is insloped as at 56 to fit into the slot 51 when in the aligned mounting position as shown at FIG. 6. A socket 57 is formed below the slot and a ball 58, urged by a spring 59 in this socket, exerts pressure against the insloped edge 56 of the lock bar. Whenever the lock bar is rotated to the alignment position, the ball is pressed against the inslope to urge the lock bar towards its locking position. The pivot holes 32 and 43 restrain the bar when the pin is being inserted into these holes. When the pin 22 is moved into mounting position and beyond the holes, the release of restraint to the lock bar permits the pressure of the ball 58 to push the lock bar to the transverse locking position.

The opposite end of the lock bar is outsloped as at 59 to provide a pointed end 60. This end 60 can be pushed into a pivot hole 32 and aligned for insertion of the pin 22 as a simple manipulation of the pin without touching the lock bar 50. The pin 22 may then be pushed through the pivot holes 32 and 43 of the side plates and the cam and to its final position. When pushed a short distance beyond this position, the ball 58 rotates the lock bar to the locking position without the need of ever touching the lock bar. By eliminating a manipulative step, the cable connector may more easily be attached to a vertical cable, an important feature to a man on a high scaffold who is attaching the connector to the vertical cable.

We have now described our invention in considerable detail. However, it is obvious that others skilled in the art can build and devise alternate and equivalent constructions which are nevertheless within the spirit and scope of our invention. Hence, we desire that our protection be limited, not by the constructions illustrated and described, but only by the proper scope of the appended claims.

What is claimed is:

1. A reversible cable connector to connect a lanyard to a vertically suspended cable, of the type which combines a U-shaped shoe to hold the cable in the crotch of the shoe with a lever arm pivotally mounted upon a pivot pin between the side plates of the shoe, the lever having a cam surface at the inner end of the lever arm engaging the cable when the lever is pulled downwardly and a connecting means at the outer end of the lever arm connecting with the lanyard, and wherein the cable connector comprises:

(a) a moderately elongated shoe of uniform cross section defining side plates and a curved crotch proportioned to receive the cable with a close fit, symmetrical from each side of a transverse centerline and with a pivot hole in each side plate at the centerline in alignment with the opposite pivot hole to receive a pivot pin;

(b) a rod forming the lever arm with a flat cable-gripping cam head at the inner end of the rod lying between the side plates of the shoe and a lanyard connecting means at the outer end of the rod;

(c) said cam head having a thickness approaching the space between the side plates of the shoe and having a symmetrical shape suggestive of an isosceles triangle with the apex end joining the rod and being symmetrically centered on the rod axis, said cam head including a cam surface at its base portion and with a pivot hole in the cam head positioned for alignment with the said side plate pivot holes when the cam surface engages the cable at the crotch of the shoe;

(d) a pivot pin fittable into said side plate pivot holes and the cam pivot hole when they are in alignment to connect the shoe and lever arms together and to mount the assembly on the cable;

and wherein:

(i) said cam surface includes a flat at the center thereof positioned to lightly engage the cable when the connector is mounted upon the cable with the arm being transverse to the cable whereby to permit easy movement of the connector along the cable;

(ii) a curved surface extending from each side of the flat with an increasing radius from the pivot pin axis, whereby to engage the cable with increasing pressure as the lever arm is rotated from the transverse position to an inclined position as by a pull of the lanyard; and (iii) a nub means at the end of each curved surface to limit the rotation of the arm to a point where additional pulling of the lanyard will not increase the grip of the cam against the cable whereby to permit the connector to slide on the cable with a selected decelerating force.

2. The cable connector defined in claim 1, wherein the curved cam surfaces are circular, with the pivot hole being eccentrically located with respect to the circular axis.

3. The cable connector defined in claim 1, wherein the pivot pin includes a lock bar at one end and a take-up spring at the other end, said lock bar being rotatable in a slot at the end of the pivot pin to rotate from an aligned position with respect to the pivot pin for insertion into the aforesaid pivot holes and to a cross locking position to lock the pivot pin in the holes, said spring bearing against the side of the shoe to hold the pin in place.

4. The cable connector defined in claim 3, wherein said lock bar is insloped at one end, the slot is proportioned to permit such end to rotate thereinto for alignment with the pin, and a resilient slide means within the slot bearing against the inclined end to urge the lock bar to the locking position.

5. The cable connector defined in claim 4 wherein the resilient slide means includes a ball urged against the end of the lock bar.

6. The cable connector defined in claim 3, wherein the lock bar is inclined at the opposite end, from the aforesaid insloped end, to form a pointed end to facilitate threading the pin into a hole.

* * * * *